Nov. 20, 1962  C. G. VINER  3,064,901
CIRCULATORY STEAM HEATING SYSTEMS
Filed April 22, 1958  2 Sheets-Sheet 2
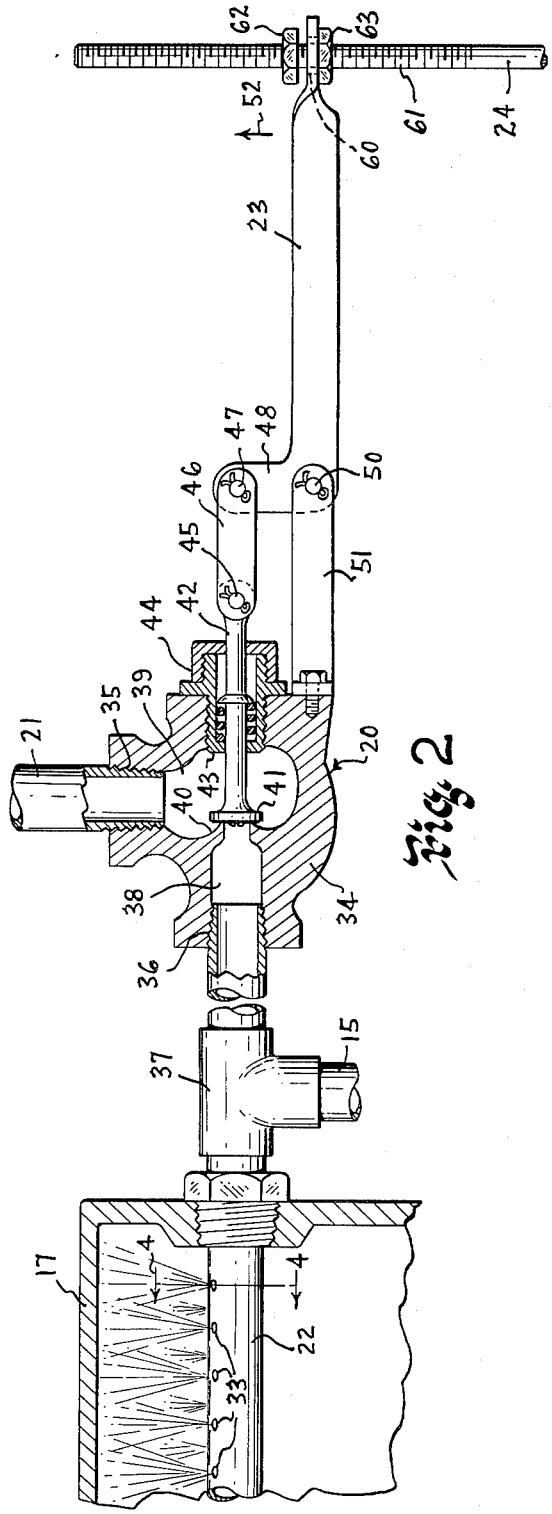
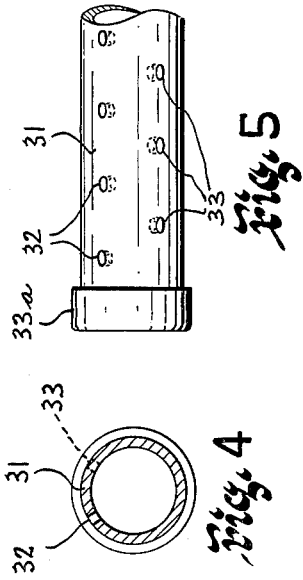
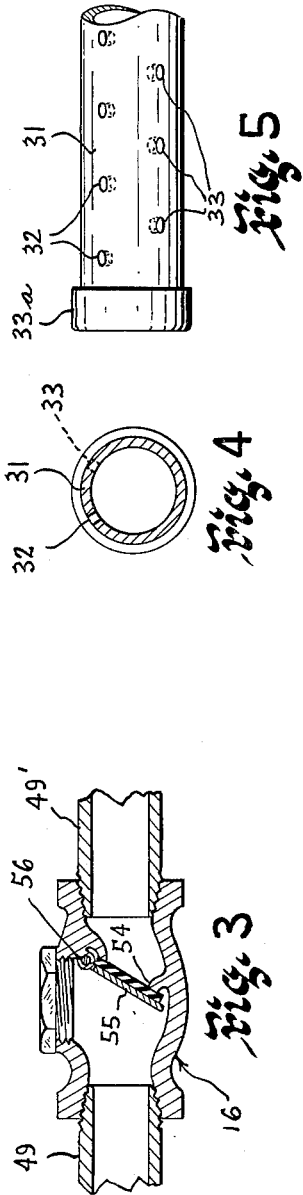
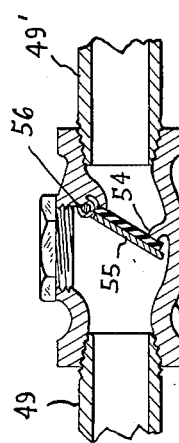
INVENTOR.
CHARLES G. VINER
BY
Louis L. Gagnon
ATTORNEY

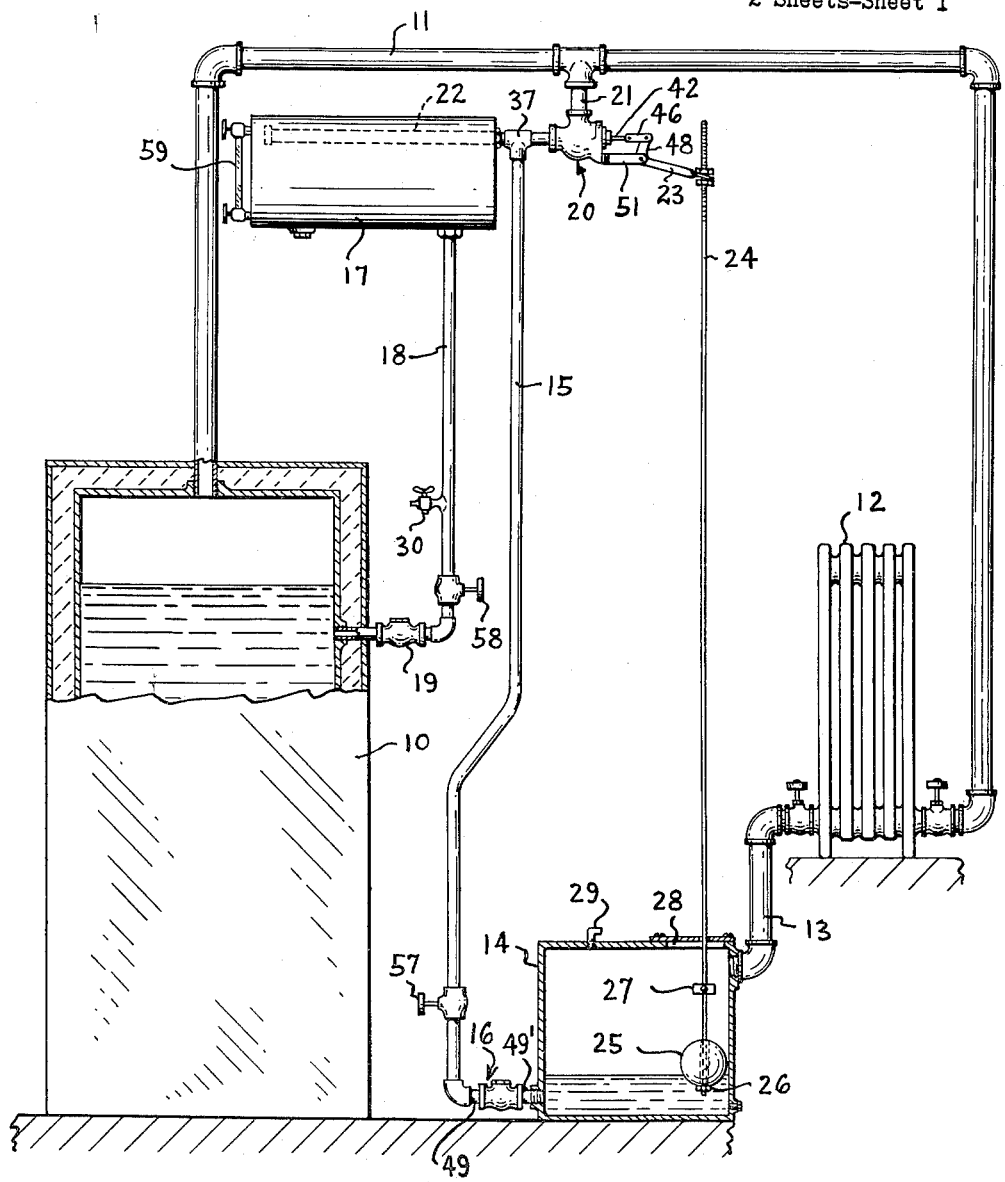

United States Patent Office 3,064,901
Patented Nov. 20, 1962

3,064,901
CIRCULATORY STEAM HEATING SYSTEMS
Charles G. Viner, P.O. Box 127, North Woodstock, Conn.
Filed Apr. 22, 1958, Ser. No. 730,180
4 Claims. (Cl. 237—9)

This invention relates to improvements in steam circulatory heating systems and has particular reference to the provision of novel means and method of returning the condensate to the steam boiler of such system.

Systems of this nature in the past, particularly in instances when the steam boiler is at a level wherein the condensate cannot be returned to the steam boiler by the action of gravity, in most instances, employed an electric pump or similar arrangement which would pump the condensate from a level below the steam boiler into said boiler and required quite complex and expensive means for bringing about this result.

It is a principal object of this invention to provide improved means and method of accomplishing the above results in a simple automatic manner which, as compared with prior art systems, is relatively inexpensive and more efficient.

Another object is to provide in steam heating systems of the above character an arrangement whereby the condensate may be collected at a level below the steam boiler and may be returned to said steam boiler by means of a vacuum system wherein the condensate is conveyed to a level above the boiler and thereafter returned to said boiler by the action of gravity in a simple and efficient manner.

Another object is to provide in a heating system of the above character having a continuous steam pressure a condensate collective tank at a location below the water level of the boiler in combination with a sealed tank above the boiler, pipelines connecting said tanks, a coupling connecting the main live steam line of the system with the pipeline connecting the tanks and a lever operated valve in said coupling for permitting live steam to flow from said live steam line into said sealed tank and for shutting the same off whereby a vacuum will be created in said sealed tank to cause the condensate in the lower collective tank to be drawn from said tank into said sealed tank and be returned from said sealed tank to the steam boiler through the pipeline connecting said sealed tank with said boiler.

Another object is to provide float means in said collective tank having a coupling with the lever operated valve for opening and closing said valve at different levels of condensate in said collective tank.

Another object is to provide check valve means in said pipeline communicating with said collective tank and said sealed tank for permitting condensate to flow from said collective tank to said sealed tank and for preventing the flow thereof in the opposite direction and check valve means in said pipeline connecting said sealed tank with the steam boiler whereby the condensate will be permitted to flow under the action of gravity from said sealed tank into the boiler and will prevent steam from passing through said pipeline in the opposite direction.

Another object is to so locate the check valve in the pipeline connecting the collective tank with the sealed tank that when the lever operated valve is open to permit live steam to flow from the live steam line into said sealed tank, the said valve will cause said pipeline to remain filled with the condensate and prevent the same from returning under the action of gravity to said collective tank whereby, when said lever operated valve is closed, the vacuum created by the cooling of the steam in the sealed tank will immediately siphon the condensate out of the lower collective tank.

Another object is to provide means internally of said sealed tank for causing a spray of said condensate to be formed internally of said sealed tank whereby a relatively rapid chilling of the steam in said sealed tank will be brought about with the result that a more rapid vacuum siphoning action will take place for drawing the condensate from the lower collective tank into the sealed tank.

Other objects and advantages of the invention will become apparent from the following description taken in connection with the accompanying drawings wherein:

FIG. 1 is a diagrammatic view shown partially in section of a system embodying the invention;

FIG. 2 is an enlarged fragmentary view shown partially in section of the lever operated valve and sealed tank connection of the system embodying the invention;

FIG. 3 is an enlarged fragmentary sectional view of check valve means employed in the invention;

FIG. 4 is an enlarged sectional view taken as on line 4—4 of FIG. 2 and looking in the direction indicated by the arrows; and FIG. 5 is a fragmentary top plan view of a portion of a spray device employed in the system embodying the invention.

Referring to the drawings wherein like characters of reference designate like parts throughout the several views, the device embodying the invention comprises a main steam boiler 10 which is coupled through a live steam line 11 to one or more radiators or the like 12 of a conventional steam heating system. The said radiator is, in turn coupled through a return pipeline 13 having a conventional steam trap therein to a collective tank 14 whereby condensate from the system may flow under the action of gravity through the trap into said collective tank, with said trap functioning in the conventional manner to prevent live steam from flowing through the pipeline 13. The collective tank 14 is connected through a condensate flow pipeline 15 with an upper sealed tank 17. The pipeline 15 is connected adjacent the bottom of the collective tank through a suitable automatically functioning check valve 16 which permits flow through the pipeline in an upward direction but prevents flow in the opposite direction.

The collective tank 14 is located at a level below the steam boiler or below the water level of said boiler or may be placed below a slab floor construction at a level below the boiler and the sealed tank 17 is located at a level considerably above the boiler or above the water level of said boiler. The sealed tank 17 is connected by a return pipeline 18 to the boiler and is provided with an automatically operating check valve 19 which will permit flow of condensate from the sealed tank 17 through said return line 18 into the boiler but will prevent flow in the opposite direction.

The pipeline 15 is further coupled through a lever operated valve 20 to a pipeline 21 which is connected with the main live steam line 11. The pipeline 15, as well as being connected with the sealed tank 17, is also coupled with spray producing means 22 internally of the sealed tank 17. The lever 23 of the valve 20 is connected by a rod or the like 24 to a float 25 internally of the collective tank 14. The float is loosely supported on the rod 24 and the rod is provided with suitable spaced stops 26 and 27 above and below the float, the function of which will be described in detail hereinafter.

The rod 24 extends through an opening in a removable plate 28 on the collective tank 14 and the said collective tank is provided with an air vent 29 which will permit air to escape from said collective tank as condensate flows into the tank by the action of gravity through the condensate pipeline 13. The said return pipeline 18 is also provided with a petcock or vent 30 whereby air may escape from the said pipeline to permit a ready flow of condensate from the sealed tank 17 into the steam boiler.

The means for creating a spray internally of the said sealed tank 17 as shown particularly in FIGS. 2, 4 and 5 comprises a hollow section 31 coupled at one end thereof directly with the condensate flow pipeline 15 internally of the tank 17. The hollow section is provided with angularly disposed spaced rows of openings 32 and 33 extending longitudinally of said section 31 with the openings in one row being in offset staggered relation with the openings in the other of said rows. The free end of the section is sealed by a suitable cap or the like 33a.

The lever operated valve 20, as shown in FIGS. 1 and 2, comprises a housing 34 having a threaded coupling 35 with the pipeline 21 which is similarly connected with the live steam line 11 and further has a coupling 36 with a T-joint 37 which connects the condensate flow line 15 with the sealed tank 17 and the spray means 22 internally of said sealed tank. The housing 34 has passageways 38 and 39 internally thereof which communicate with each other through a valve comprising a valve seat 40 which is engaged by a valve contact 41 of graphite or other suitable material which will form a tight seal with said seat. The valve contact 41 is carried by a stem 42 reciprocally mounted within a stem guide 43 threadedly connected with the housing 34 and in which there is provided a packing of graphite and asbestos or other suitable packing which will prevent the escape of steam from internally of said housing 34.

The stem guide is provided with a backing retaining ring nut or the like 44 threaded on a suitable extension provided on the stem guide 43 for retaining the packing internally thereof. The stem 42 is, in turn, pivotally connected at 45 with a link 46. The link 46 is pivotally connected at 47 to an angular bell crank portion 48 carried by the lever 23 and which is pivotally connected at 50 with a suitable support 51 carried by the valve housing 34. The angular disposed bell crank portion 48 and lever 23 are such that movement of said lever 23 in an upward direction as indicated by the arrow 52 will force the valve contact 41 in closed relation with the valve seat 40 to prevent the passage of live steam through said housing 20 into the spray means 22. Movement of said lever 23 in the opposite direction to the arrow 52 will cause said valve contact 41 to be moved away from the valve seat 40 whereby live steam will flow from the pipe 21 through the housing 20, through the T-joint 37 and through the spray device 22 into the sealed tank 17.

As stated above the lever 23 is connected by a rod 24 to the float 25 internally of the collective tank 14. The check valve 16 is of a conventional type such as shown in section in FIG. 3. The valve 16 is connected at one end to the collective tank 14 and at its opposite end with the condensate flow line 15 through suitable couplings 49 and 49' as shown in FIGS. 1 and 3. The said valve is of a conventional flap type comprising a valve seat 54 adapted to be engaged by a flap valve portion 55 pivotally connected at 56 whereby it will open in response to the flow of the condensate outwardly of the tank 14 and automatically close when said condensate ceases to flow. The check valve 19 is similar in construction to the valve 16 and is so constructed as to open in response to the gravital flow of the condensate from the sealed tank 17 into the boiler 10 and to automatically close to prevent flow in the opposite direction.

Suitable manually operable valves 57 and 58 may be provided in the respective condensate flow line 15 and the return line 18, if desired, whereby the flow of condensate through said lines may be manually shut off if desired.

It is to be understood that all of the couplings of the various pipelines, valves, etc., must be air and gas tight and that the system may be used with either high or low pressure for small or large capacity as desired.

While the device embodying the invention is shown and described as being used with radiators at a location below the water line of the steam boiler, it is to be understood that the radiators may be located above the water line as well as below the steam boiler as desired. Also, some of the radiators may be located above and some below the steam boiler if desired.

A suitable conventional water gauge 59 may be provided on the side of the sealed tank 17 if desired.

It is further pointed out that the rod 24 extends through an opening 60 in the end of the lever 23 and is provided with a threaded portion 61 on which a pair of nuts 62 and 63 are threaded on opposite sides of the end of the lever to provide means for varying the effective length of the rod and the cycle of the operation of the valve 20 as required.

The operation of the device is substantially as follows: Under ordinary working conditions steam is forced from the boiler through the live steam line 11 into the heating unit 12 and the valve 20 is normally in open position in response to the gravitational pull of the rod 24 and the float 25 when no condensate is in the collective tank 14. When the valve 20 is in this open position live steam will flow through the pipeline 21 into the sealed tank 17 through the spray means 22 thereby filling said sealed tank 17 with live steam. As the condensate flows under the action of gravity through the condensate pipeline 13 into the collective tank 14 the float 25 will rise on the rod 24 and upon engaging the upper stop member 27 on said rod will cause the lever 23 to be raised and the valve 20 to be closed. This shuts off live steam from entering the tank 17 whereupon cooling of the steam internally of said sealed tank will immediately create a vacuum causing the condensate to be drawn upwardly of the condensate flow line 15 into said tank 17.

As the said condensate is initially drawn into the sealed tank 17, it will create a spray in response to the function of the spray means 22 whereupon the steam internally of said tank will be quickly chilled causing an immediate vacuum suction which will siphon the condensate out of the collective tank 14 into the tank 17. As the condensate level decreases in the collective tank 14, the float 25 will drop and when lowered a predetermined amount will engage the stop 26 thereby causing the lever 23 to be moved downwardly and the valve 20 to be opened.

During this function the condensate will flow under the action of gravity throughout the return pipeline 18 from the sealed tank 17 into the steam boiler 10 and said flow will be more rapidly created by the live steam initially being forced into the sealed tank 17 as the valve 20 again starts to open.

It is pointed out that the valve 16, immediately upon the opening of the valve 20, will close thereby preventing the condensate in the condensate flow pipeline 15 to flow in said pipeline, that is, it will be prevented from returning under the action of gravity or by the force of the steam entering through the valve 20 from forcing said condensate back into the collective tank 14. The valve 19 on the other hand will automatically close to prevent live steam from being forced upwardly through the return line 18 and will thereby cause the steam to fill said sealed tank 17 to a pressure substantially equalling that of the pressure internally of the steam boiler.

The above cycle of operation will continue automatically as the condensate flows under the action of gravity through the pipeline 13 into the collective tank 14 and will thereby permit the heating unit 12 to be located at a level below the steam boiler if desired. This, therefore, does not necessitate that the steam boiler be located in the basement of a building such as has been required in most instances in the past when the condensate must be returned to the boiler solely by the action of gravity.

From the foregoing description, it will be seen that simple, efficient and economical means and methods have been provided for accomplishing all of the objects and advantages of the invention. It is to be understood, however, that various modifications may be made in the system while retaining substantially the same principle of operation without departing from the spirit of the invention as expressed in the accompanying claims, as one system only has been shown and described by way of illustration.

Having described my invention, I claim:

1. In a heating system having substantially constant steam pressure, the combination of a steam boiler, a radiator, a first pipeline for directing live steam into said radiator, a receiving tank at a location below the water level of said steam boiler, a second pipeline connecting said radiator with said receiving tank through which condensate may flow from said radiator into said receiving tank, a sealed tank at a location above the water level in the steam boiler, a third pipeline connecting said receiving tank with the sealed tank, a steam passageway connecting the live steam pipeline with said third pipeline and with said sealed tank, a fourth pipeline connecting said sealed tank wth the steam boiler, single automatically functioning valve means in said steam passageway, and a float in said receiving tank connected with said single valve which, when open as the result of the float being at a low position in the receiving tank, will permit live steam to enter said upper sealed tank and when closed, as the result of the float being at a high position in said receiving tank, will shut off said live steam and cause a vacuum to be created in said sealed tank to draw condensate from said receiving tank up into said sealed tank whereby said condensate will thereafter flow from said sealed tank through said fourth pipeline into said steam boiler, said single valve being opened when the condensate in the receiving tank is at a given low level and being closed when the condensate is at a given high level.

2. In a steam heating system, the combination of a steam boiler, a radiator, a first pipeline connecting said boiler with said radiator and through which live steam may be directed into the radiator, a receiving tank at a location below the water level of the steam boiler, a second pipeline connecting the radiator to said receiving tank and through which condensate from said radiator may flow into said receiving tank, a sealed tank located at a level above the water in the steam boiler, a third pipeline connecting said sealed tank with the first pipeline and with the receiving tank, said third pipeline having a single lever operated valve located between it and the first pipeline, a check valve in said third pipeline, said check valve being adapted to allow flow of condensate from said receiving tank into said sealed tank and to prevent flow in the opposite direction, a fourth p'peline connecting said sealed tank with the steam boiler, said fourth pipeline having a check valve therein for permitting flow of condensate from said sealed tank into the steam boiler and for preventing flow in the opposite direction and a float in said receiving tank connected with said lever operated valve which when at its lowermost position in said receiving tank will cause said valve to open and allow steam to flow from said live steam line into said sealed tank, said float, upon the flow of condensate from the radiator into said receiving tank, being adapted to rise and to cause the lever operated valve to close and shut off the flow of live steam into said sealed tank whereby the cooling of the steam in said sealed tank will create a vacuum and cause the condensate to be drawn from the receiving tank into said sealed tank and to flow from said tank through the fourth pipeline into the steam boiler, said float, when the condensate is drawn from the receiving tank, being adapted to drop under the action of gravity to again open the lever operated valve whereupon live steam will flow from said live steam line into said sealed tank to cause said cycle of operation to be repeated.

3. In a heating system having substantially constant steam pressure, the combination of a steam boiler, a radiator, a receiving tank at a location below the water level of said steam boiler, a sealed tank at a location above the water level of the steam boiler, means for directing condensate from said radiator into said receiving tank, a pipeline connected with the receiving tank and having a common connection with said sealed tank, a second pipeline connecting the live steam from the boiler with the radiator, a third pipeline connected with the live steam line and with the sealed tank through said common connection of said first pipeline with said sealed tank, a one-way valve in said first pipeline permitting condensate from the receiving tank to be drawn upwardly thereof into the sealed tank while preventing flow in the opposite direction, single valve means in said third pipeline connecting the live steam with the sealed tank through said common connection of the first pipeline with said sealed tank operably connected with a float in the receiving tank and functioning in response to the level of the condensate in the receiving tank for opening said valve means and permitting live steam to flow into said sealed tank when the condensate in the receiving tank is at a low level and for shutting off said valve means to stop the flow of the live steam when the condensate is at a high level, vacuum creating means in said sealed tank connected with said first pipeline and responsive to the closing of said valve means in said live steam line for causing a vacuum to be formed and to draw the condensate upward y from said receiving tank into said sealed tank and means for permitting the return of condensate from said sealed tank to said boiler partially by gravity and partially by the force of the steam when the valve means is again opened to permit live steam to be directed into the sealed tank.

4. In a heating system having substantially constant steam pressure, the combination of a steam boiler, a radiator, a receiving tank at a location below the water level of said steam boiler, a sealed tank at a location above the water level of the steam boiler, means for directing condensate from said radiator into said receiving tank, a pipeline connected with the receiving tank and having a common connection with said sealed tank, a second pipeline connecting the live steam from the boiler with the radiator, a third pipeline connected with the live steam line and with the sealed tank through said common connection of said first pipeline with said sealed tank, a one-way valve in said first pipeline permitting condensate from the receiving tank to be drawn upwardly thereof into the sealed tank while preventing flow in the opposite direction, single valve means in said third pipeline connecting the live steam with the sealed tank through said common connection of the first pipeline with said sealed tank operably connected with a float in the receiving tank and functioning in response to the level of the condensate in the receiving tank for opening said valve means and permitting live steam to flow into said sealed tank when the condensate in the receiving tank is at a low level and for closing said valve means and shutting off the live steam when the condensate is at a high level, vacuum creating means in the form of a hollow member having a plurality of perforations in a side wall thereof located in said sealed tank in connected relation with said first pipeline and responsive to the closing of said valve means in said live steam line for causing a vacuum to be formed and to draw the condensate upwardly from said receiving tank into said sealed tank and means for permitting the return of condensate from said sealed tank to said boiler partially by gravity and partially by the force of the steam when the valve means is again opened to permit live steam to be directed into the sealed tank.

References Cited in the file of this patent

UNITED STATES PATENTS

| | | |
|---|---|---|
| 558,608 | Norris | Apr. 21, 1896 |
| 902,283 | English | Oct. 27, 1908 |
| 2,159,345 | Strobel | May 23, 1939 |
| 2,639,675 | Williams | May 26, 1953 |